United States Patent
La Sana et al.

(10) Patent No.: US 11,795,852 B2
(45) Date of Patent: Oct. 24, 2023

(54) HEATING DEVICE FOR AN EXHAUST SYSTEM OF AN INTERNAL COMBUSTION ENGINE

(71) Applicant: MARELLI EUROPE S.P.A., Corbetta (IT)

(72) Inventors: Marco La Sana, Corbetta (IT); Emanuele Milani, Corbetta (IT); Mauro Brignone, Corbetta (IT); Luigi Lubrano, Corbetta (IT); Alessandro Mantovanelli, Corbetta (IT)

(73) Assignee: MARELLI EUROPE S.P.A., Corbetta (IT)

( * ) Notice: Subject to any disclaimer, the term of this patent is extended or adjusted under 35 U.S.C. 154(b) by 0 days.

(21) Appl. No.: 17/931,941

(22) Filed: Sep. 14, 2022

(65) Prior Publication Data

US 2023/0085477 A1 Mar. 16, 2023

(30) Foreign Application Priority Data

Sep. 14, 2021 (IT) ................... IT102021000023678

(51) Int. Cl.
*F01N 3/20* (2006.01)
*F01N 3/32* (2006.01)
(Continued)

(52) U.S. Cl.
CPC ............ *F01N 3/2033* (2013.01); *F01N 3/32* (2013.01); *F01N 3/36* (2013.01); *F01N 3/38* (2013.01); *F01N 2240/14* (2013.01)

(58) Field of Classification Search
CPC . F01N 3/2033; F01N 3/32; F01N 3/36; F01N 3/38; F01N 2240/14
See application file for complete search history.

(56) References Cited

U.S. PATENT DOCUMENTS 5,063,737 A 11/1991 Lopez-Crevillen et al.
5,320,523 A * 6/1994 Stark .................. F01N 3/2033
60/303

(Continued)

FOREIGN PATENT DOCUMENTS

EP 0631039 A1 12/1994
WO 2006137695 A1 12/2006

(Continued)

OTHER PUBLICATIONS

Search Report for Italian Patent Application No. 202100023678 dated Apr. 6, 2022.

*Primary Examiner* — Brandon D Lee
(74) *Attorney, Agent, or Firm* — Howard & Howard Attorneys PLLC

(57) ABSTRACT

A heating device for an exhaust system of an internal combustion engine and having: a tubular body, which contains a combustion chamber and is delimited by a first base wall and by a second base wall; a fuel injector, which is mounted through the first base wall; at least one inlet opening, which can be connected to a fan so as to receive an air flow; a feeding channel, which receives air from the inlet opening, surrounds an end portion of the fuel injector and ends with a nozzle arranged around an injection point of the fuel injector; a spark plug, which is mounted through a side wall of the tubular body; and a flame holder body, which is at least partially arranged inside the feeding channel in the area of the nozzle, is coaxial to the feeding channel and to the fuel injector and is in front of the injection point of the fuel injector.

14 Claims, 10 Drawing Sheets

(51) Int. Cl.
*F01N 3/36* (2006.01)
*F01N 3/38* (2006.01)

(56) References Cited

U.S. PATENT DOCUMENTS

| | | | |
|---|---|---|---|
| 8,006,487 B2 | 8/2011 | Gaiser | |
| 2010/0077731 A1* | 4/2010 | Jeong | F01N 3/0256 60/303 |
| 2014/0102426 A1* | 4/2014 | Thangaswamy | F23K 5/147 123/568.11 |
| 2014/0237999 A1* | 8/2014 | Olivier | F01N 3/035 60/303 |
| 2022/0112830 A1* | 4/2022 | Sofan | F01N 3/38 |

FOREIGN PATENT DOCUMENTS

| | | | |
|---|---|---|---|
| WO | 2006138174 | A2 | 12/2006 |
| WO | 2012139801 | A1 | 10/2012 |

* cited by examiner

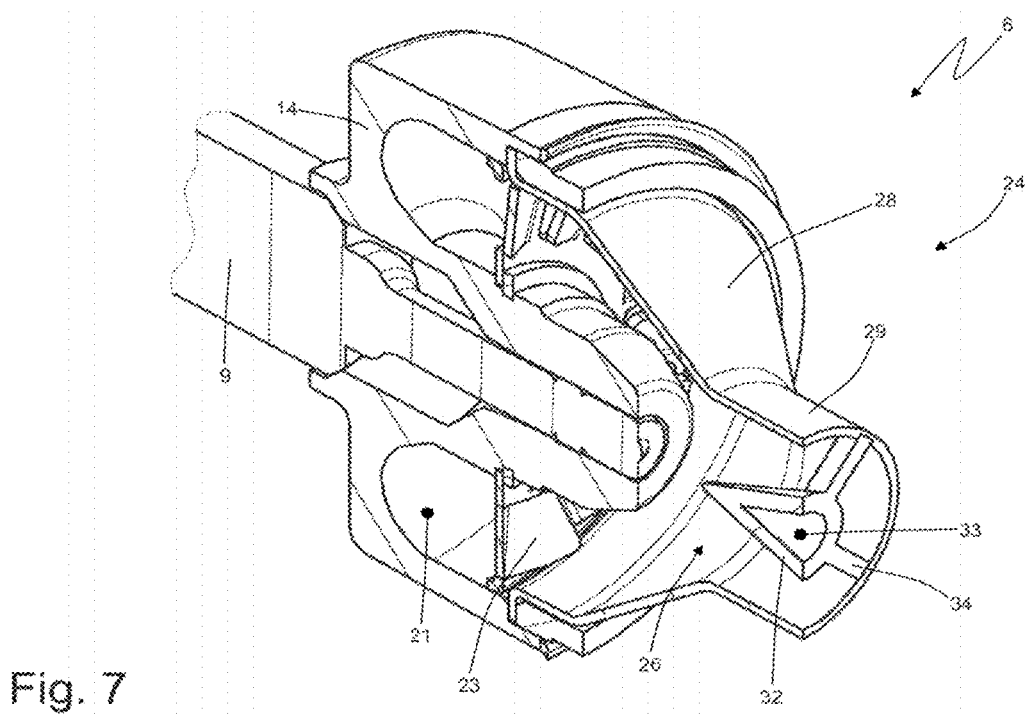
Fig. 7
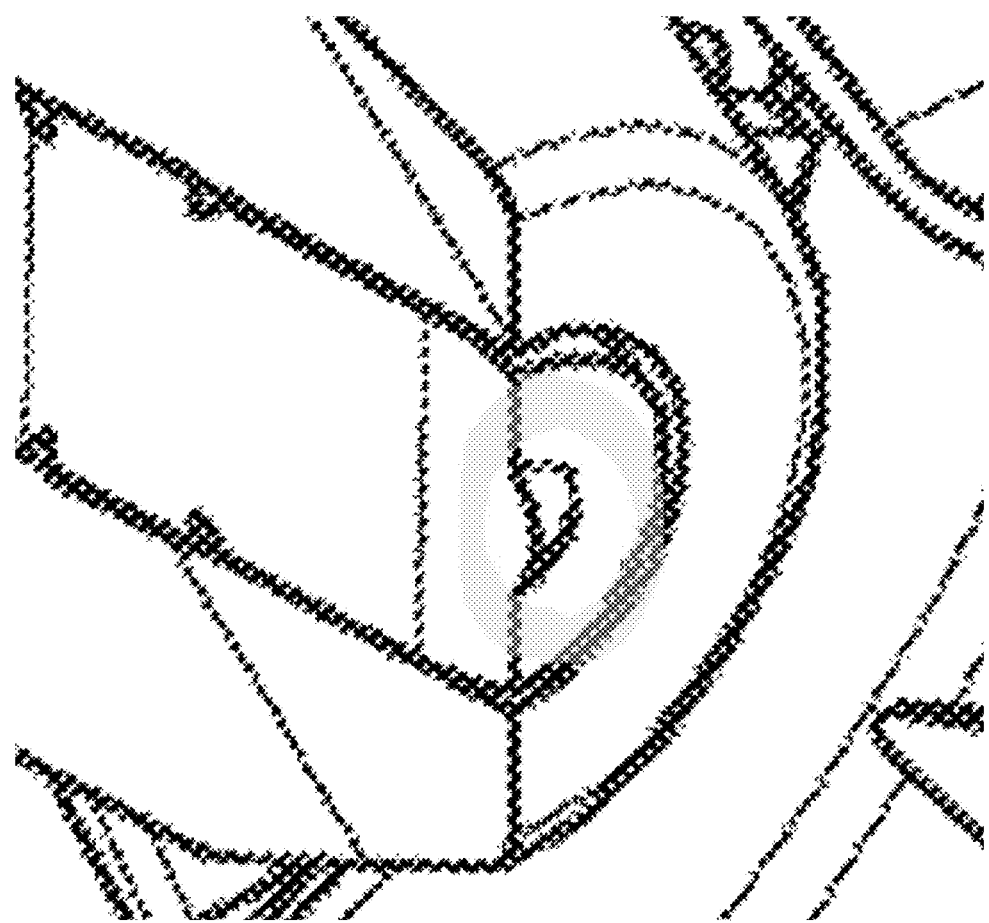

HEATING DEVICE FOR AN EXHAUST SYSTEM OF AN INTERNAL COMBUSTION ENGINE

CROSS-REFERENCE TO RELATED APPLICATIONS

This patent application claims priority from Italian patent application no. 102021000023678 filed on Sep. 14, 2021, the entire disclosure of which is incorporated herein by reference.

TECHNICAL SECTOR

The invention relates to a heating device for an exhaust system of an internal combustion engine.

BACKGROUND ART

An exhaust system of an internal combustion engine comprises an exhaust duct, along which there is installed at least one device for the treatment of the exhaust gases coming from the internal combustion engine; in particular, there always is a catalytic converter (either an oxidation catalytic converter or a reduction catalytic converter), to which a particulate filter can be added. The catalytic converter, in order to work (namely, in order to carry out a catalytic conversion), needs to operate at a relatively high operating temperature (a modern catalytic converter works at temperatures even close to 800° C.), since the chemical reactions for the conversion of unburnt hydrocarbons, nitrogen oxides and carbon monoxide into carbon dioxide, water and nitrogen take place only once the work temperature has been reached.

During a cold start phase (i.e. when the internal combustion engine is turned on after having been turned off for a long time, thus causing the temperature of the different components of the internal combustion engine to reach ambient temperature), the temperature of the catalytic converter remains, for a relatively long amount of time (even some minutes in winter and during a city travel, along which the internal combustion engine idles or runs very slow), significantly below the operating temperature. As a consequence, during the cold start phase, namely for the amount of time in which the catalytic converter has not reached its operating temperature yet, polluting emissions are very high, since the purification effect of the catalytic converter is close to zero or, anyway, is scarcely effective.

In order to speed up the reaching of the operating temperature of the catalytic converter, patent documents EP0631039A1, WO2012139801A1, US8006487B2, WO2006137695A1, WO2006138174A2, US5063737A and US5320523A suggest installing, along the exhaust duct, a heating device, which, by burning fuel, generates a (very) hot air flow, which flows through the catalytic converter. In particular, the heating device comprises a combustion chamber, which is connected, at the outlet, to the exhaust duct (immediately upstream of the catalytic converter) and is connected, at the inlet, to a fan, which generates an air flow flowing through the combustion chamber; in the combustion chamber there also are a fuel injector, which injects fuel to be mixed with air, and a spark plug, which cyclically produces sparks to ignite the air-fuel mixture in order to obtain the combustion that heats the air.

In known heating devices, the combustion of fuel is not always complete in all operating conditions and, therefore, it can happen (especially when a large quantity of fuel is injected in order to develop a large quantity of heat) that unburnt fuel reaches the exhaust duct; unburnt fuel, when it reaches the exhaust duct, can burn inside the exhaust duct, thus locally determining sudden, unexpected and undesired temperature increases, or it can fail to burn (for example, due to the lack of a suitable ignition or due to the lack of oxygen) inside the exhaust duct and, hence, be released into the atmosphere, thus increasing the quantity of polluting emissions (in particular, unburnt HC groups).

In particular, known heating devices have shown that the flame generated in the combustion chamber in some operating conditions (especially in case of a "lean" combustion, which takes place with excess oxygen) becomes unstable and tends to extinguish (thus, not always burning all the injected fuel) or to move back and forth with an oscillatory movement which cyclically causes the flame to reach out of the combustion chamber, thus moving towards the exhaust duct (in this case, again, part of the injected fuel can remain unburnt and, above all, the exhaust duct is heated in an excessive and potentially harmful manner).

DESCRIPTION OF THE INVENTION

The object of the invention is to provide a heating device for an exhaust system of an internal combustion engine, said heating device permitting a complete and stable fuel combustion in all operating conditions (namely without introducing unburnt fuel into the exhaust duct and without excessively heating the exhaust duct) and, furthermore, being simple and economic to be manufactured.

According to the invention, there is provided a heating device for an exhaust system of an internal combustion engine according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein:

FIG. 7 is a perspective, longitudinal section view of the outer tubular body of FIG. 6;

PREFERRED EMBODIMENTS OF THE INVENTION

Figure 1:
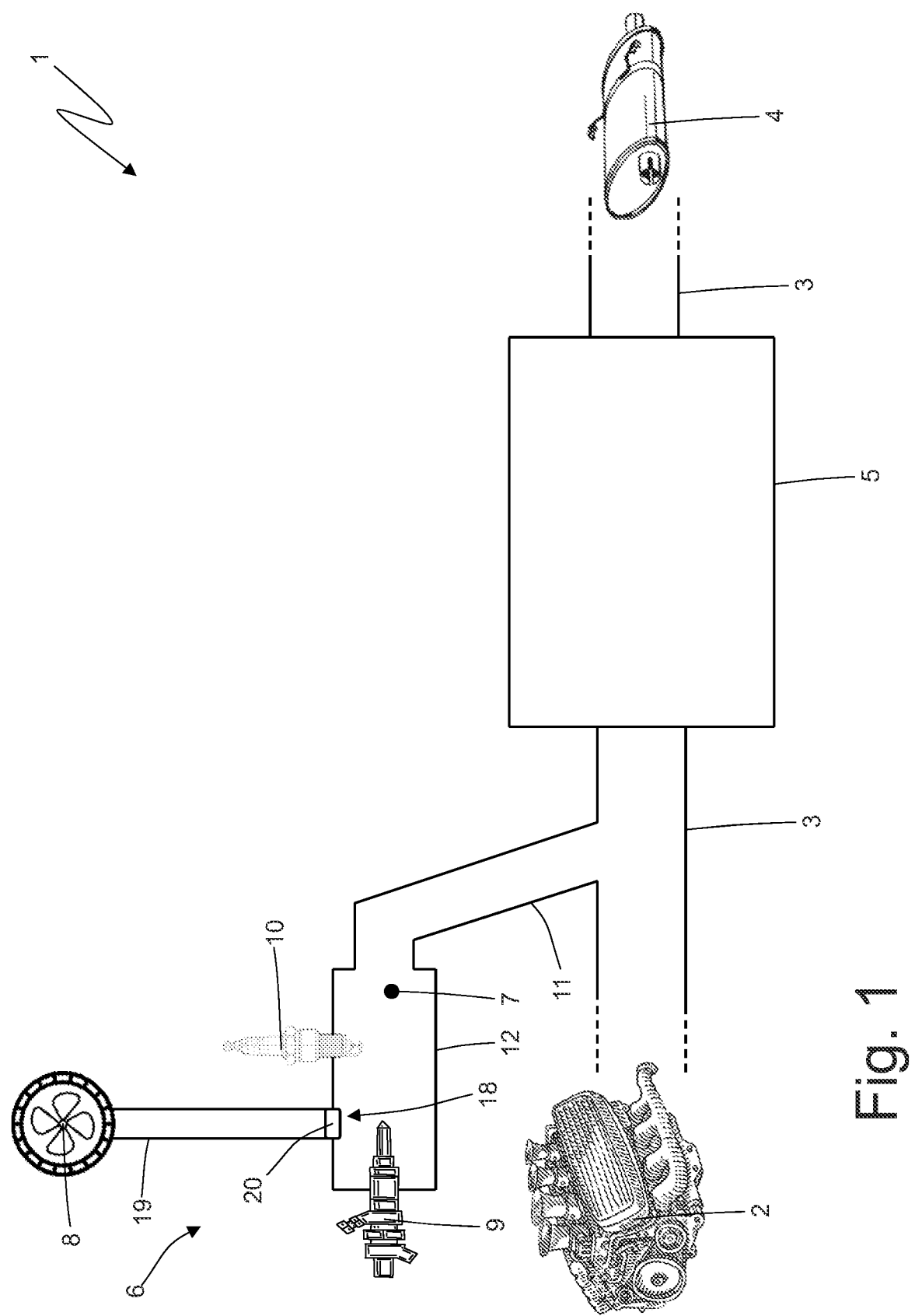
FIG. 1 is a schematic, partial view of an exhaust system of an internal combustion engine provided with a heating device according to the invention.

In FIG. 1, number 1 indicates, as a whole, an exhaust system of an internal combustion engine 2.

The exhaust system 1 comprises an exhaust duct 3, which originates from an exhaust manifold of the internal combustion engine 2 and ends with a silencer 4, from which exhaust gases are released into the atmosphere. Along the exhaust duct 3 there is installed at least one device 5 for the treatment of the exhaust gases coming from the internal combustion engine; in particular, there always is a catalytic converter (either an oxidation catalytic converter or a reduction catalytic converter), to which a particulate filter can be added. The catalytic converter, in order to work (namely, in order to carry out a catalytic conversion), needs to operate at a relatively high operating temperature (a modern catalytic converter works at temperatures even close to 800° C.), since the chemical reactions for the conversion of unburnt hydrocarbons, nitrogen oxides and carbon monoxide into carbon dioxide, water and nitrogen take place only once the work temperature has been reached.

In order to speed up the heating of the treatment device 5, namely in order to allow the treatment device 5 to reach its operating temperature more quickly, the exhaust system 1 comprises a heating device 6, which, by burning fuel, generates a (very) hot air flow, which flows through the treatment device 5.

The heating device 6 comprises a combustion chamber 7, which is connected, at the outlet, to the exhaust duct 3 (immediately upstream of the treatment device 5) and is connected, at the inlet, to a fan 8 (namely, to an air pump), which generates an air flow flowing through the combustion chamber 7; in the combustion chamber 7 there also are a fuel injector 9, which injects fuel to be mixed with air, and a spark plug 10, which cyclically produces sparks to ignite the air-fuel mixture in order to obtain the combustion that heats the air. The combustion chamber 7 of the heating device 6 ends with an outlet duct 11, which leads into the exhaust duct 3 (immediately upstream of the treatment device 5).

In particular, the injector 9 has a fuel outlet hole, from which fuel flows out of the fuel injector 9 and which defines an injection point of the fuel injector 9.

Figure 2:
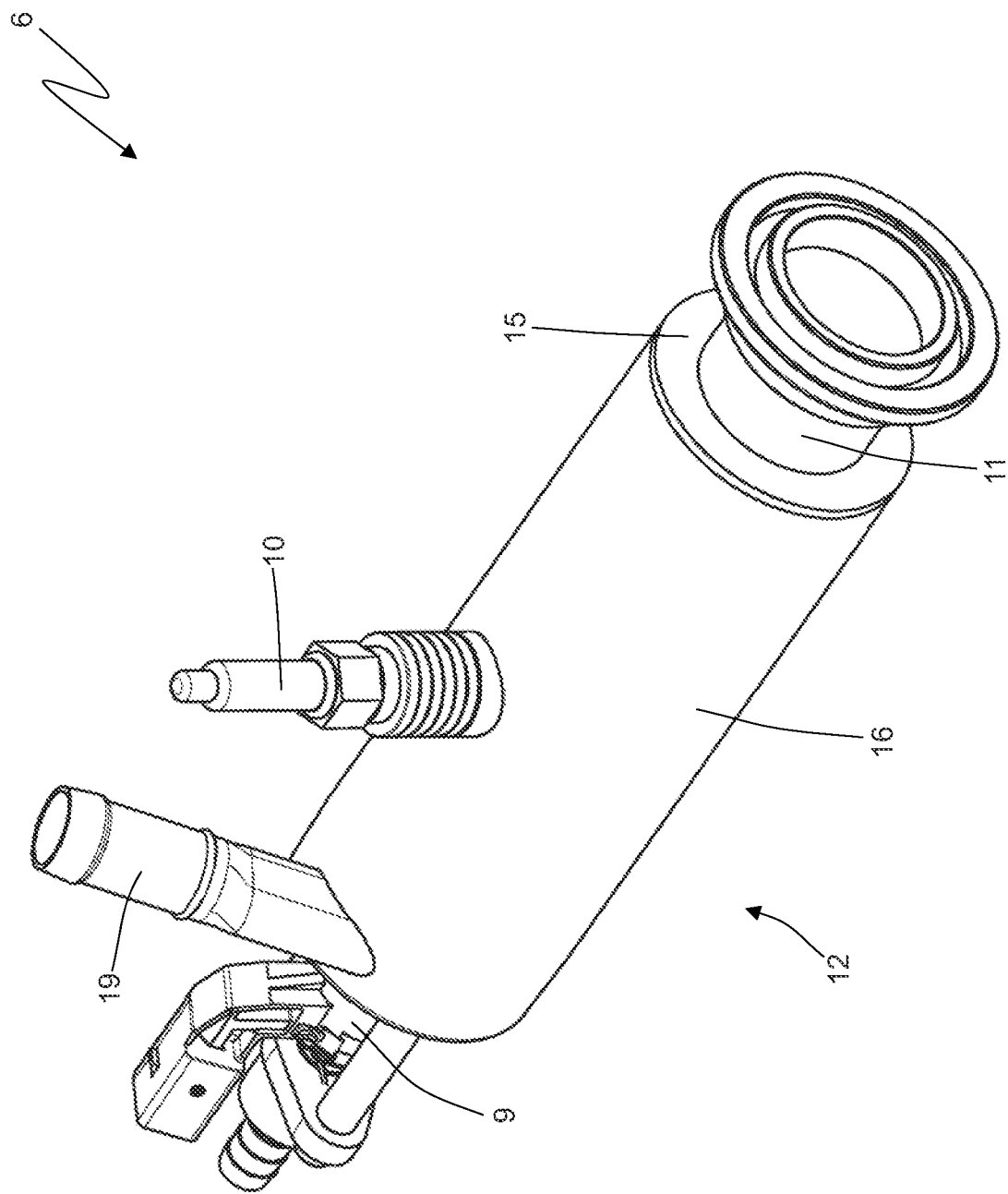
FIG. 2 is a perspective view of the heating device of FIG. 1.
Figure 3:
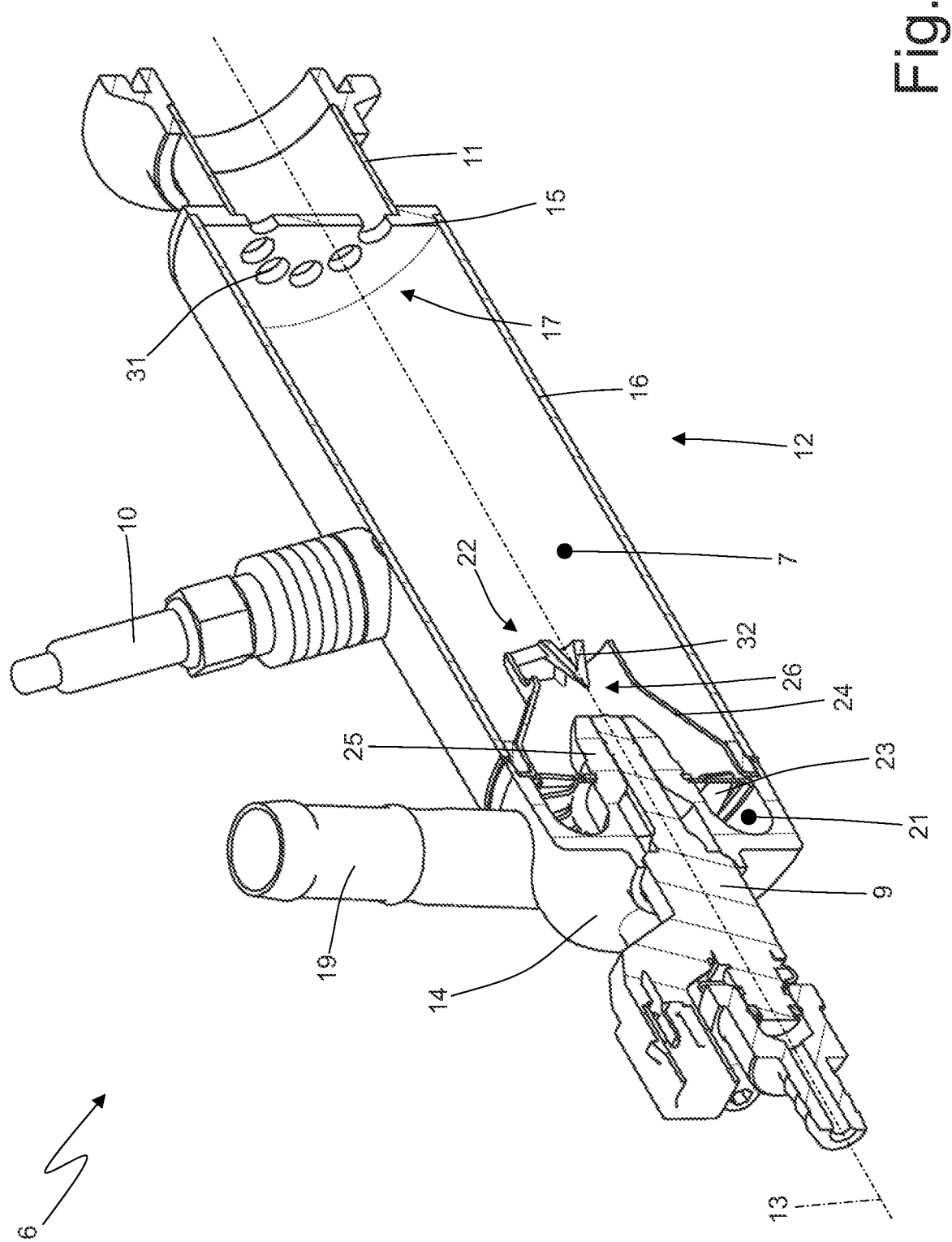
FIG. 3 is a perspective, longitudinal section view of the heating device of FIG. 1.
Figure 4:
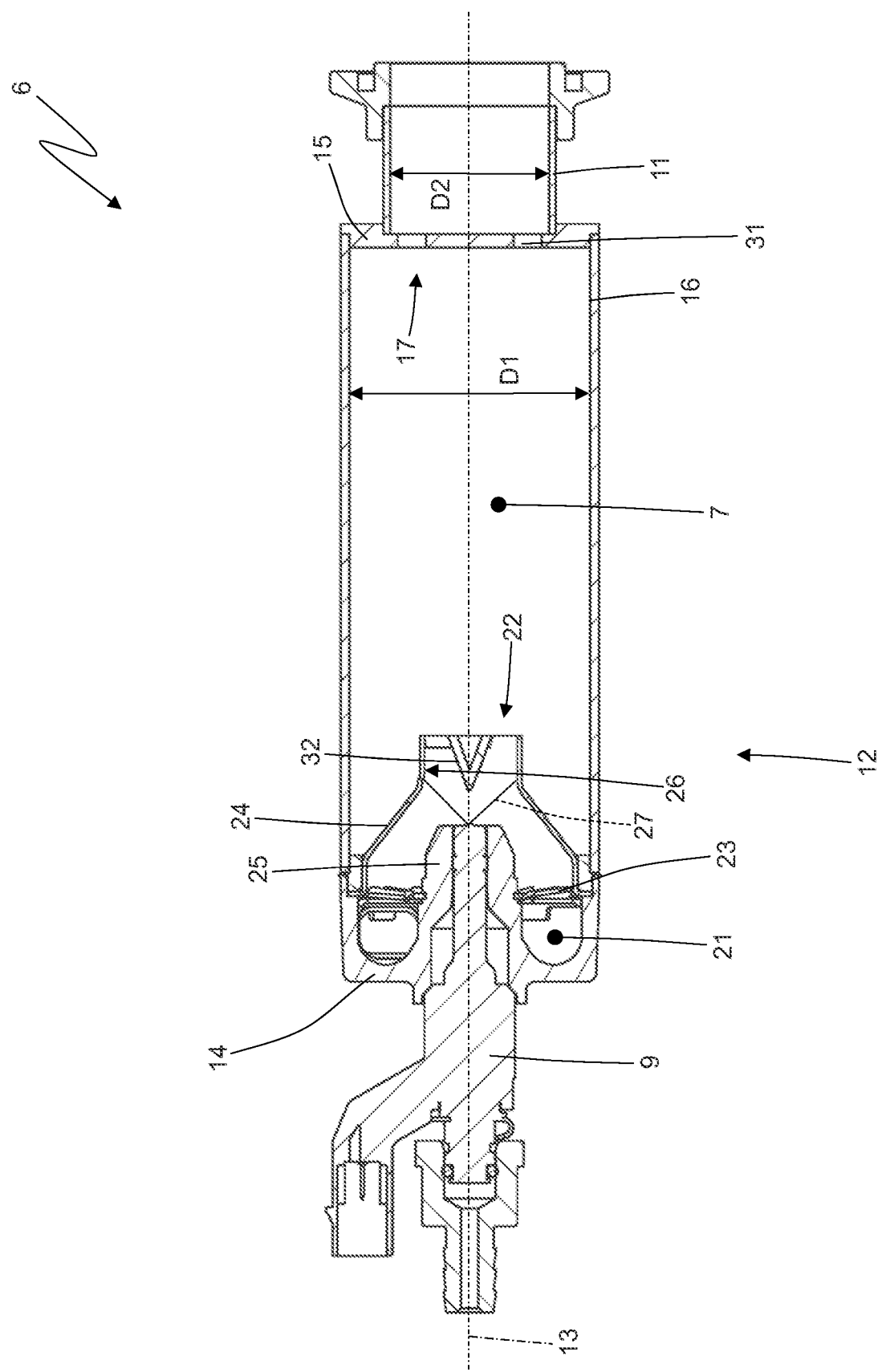
FIG. 4 is a longitudinal section view of the heating device of FIG. 1.

According to FIGS. 2, 3 and 4, the heating device 6 comprises a tubular body 12 (for example, with a cylindrical shape and having a circular or elliptical cross section) having a longitudinal axis 13; the tubular body 12 is delimited, at the two ends, by two opposite base walls 14 and 15 and is laterally delimited by a side wall 16, which connects the two base walls 14 and 15 to one another. The base wall 14 is perforated at the centre so as to accommodate the fuel injector 9, which is mounted coaxially to the tubular body 12 (namely, coaxially to the longitudinal axis 13); in other words, the fuel injector 9 is mounted through the base wall 14 of the tubular body 12 so as to inject fuel into the combustion chamber 7. Similarly, the base wall 15 is perforated at the centre so as to be fitted onto the outlet duct 11, which ends in the exhaust duct 3; namely, the base wall 15 has an outlet opening 17 to let hot air out of the combustion chamber 7, from which the outlet duct 11 originates.

According to FIGS. 2 and 3, through the tubular body 12 there is obtained (at least) an inlet opening 18 (shown in FIG. 1), which is connected to the fan 8 by means of an inlet duct 19 (shown in FIGS. 1, 2 and 3) in order to receive an air flow, which is directed towards the combustion chamber 7 and is mixed with the fuel injected by the fuel injector 9. Preferably, air flows into the inlet opening 18 with a flow that is oriented tangentially (relative to the tubular body 12), namely the inlet duct 19 is oriented tangentially (relative to the tubular body 12).

According to a possible, though non-binding embodiment shown in FIG. 1, in the area of the inlet opening 18 there is a non-return valve 20, which allows for an air flow only towards the combustion chamber 7 (namely, flowing into the tubular body 12). Preferably, the non-return valve 20 is passive (namely, does not comprise electric, hydraulic or pneumatic actuators generating a movement), is pressure-controlled and opens only when a pressure upstream of the non-return valve 20 is higher than a pressure downstream of the non-return valve 20. The function of the non-return valve 20 is that of preventing, when the heating device 6 is not used (namely, when the fan 8 is turned off), exhaust gases from flowing back until they flow out of the inlet opening 18 and, hence, are released into the atmosphere without going through the treatment device 5. Alternatively, the non-return valve 20 could be mounted along the outlet duct 11, for example in the area of the outlet opening 17; in this case, the non-return valve 20 allows air to only flow out of the combustion chamber 7 (out of the tubular body 12) towards the exhaust duct 3, namely it prevents exhaust gases from flowing from the exhaust duct 3 towards the combustion chamber 7 (into the tubular body 12).

According to FIGS. 3 and 4, the heating device 6 comprises a feeding channel 21, which receives air from the inlet opening 18, surrounds an end portion of the fuel injector 9 and ends with a nozzle 22, which is arranged around an injection point of the fuel injector 9 (namely, around a spray tip of the fuel injector 9, from which fuel flows out).

The spark plug 10 (provided with a pair of electrodes) is mounted through the side wall 16 of the tubular body 12 in order to trigger the combustion of an air and fuel mixture, which is obtained because of the mixing of air, which flows into the tubular body 12 from the inlet opening 18 and is introduced into the combustion chamber 7 by the nozzle 22 of the feeding channel 21, and fuel, which is injected into the combustion chamber 7 by the fuel injector 9. In particular, the side wall 16 of the tubular body 12 has a through hole, which is oriented radially (namely, perpendicularly to the longitudinal axis 13) and accommodates, on the inside (screwed into it), the spark plug 10 (which is obviously oriented radially).

The heating device 6 comprises a static mixer 23 (namely, without moving parts), which has the shape of an annulus, is arranged along the feeding channel 21 and around the fuel injector 9 and is configured to generate turbulences, in particular a (rotary) swirling motion, in the air flowing towards the nozzle 22. The static mixer 23 is configured to generate a (rotary) swirling motion in the air flowing towards the nozzle 22 having a given direction of rotation around the longitudinal axis 13 (namely, a clockwise direction or a counterclockwise direction around the longitudinal axis 13).

According to a preferred, though non-binding embodiment shown in FIGS. 3 and 4, downstream of the static mixer 23, the feeding channel 21 has a progressive reduction of the area of the cross section, so as to determine an increase in the air speed. In particular, downstream of the static mixer 23, the feeding channel 21 has an initial portion having a constant cross section area, an intermediate portion having a progressively decreasing cross section area and an end portion having a cross section area that is constant up to the nozzle 22.

The feeding channel 21 is delimited, on the outside, by an (at least partially conical) outer tubular body 24 and is delimited, on the inside, by an (at least partially conical) inner tubular body 25, which surrounds the fuel injector 9 and contains, on the inside, the fuel injector 9 (namely, serves as container for the end part of the fuel injector 9). Hence, the feeding channel 21 (in its end part) is defined between the inner tubular body 25 and the outer tubular body 24. In particular, the two tubular bodies 24 and 25 alternate conical portions (i.e. having a converging shape that progressively decreases its size along the longitudinal axis 13) with cylindrical portions (i.e. having a shape with a constant size along the longitudinal axis 13); preferably, the end part of the inner tubular body 25 has a converging taper (namely, which progressively reduces its size towards the nozzle 22), whereas the end part of the outer tubular body 24 has a cylindrical shape.

According to a preferred embodiment, air flows into the feeding channel 21 with a tangentially oriented flow so as to have a (rotary) swirling motion, which is subsequently increased by the action of the static mixer 23 and helps it get mixed with the fuel injected by the fuel injector 9; in other words, the introduction of oxidizing air into the combustion chamber 7 through a duct oriented tangentially to the combustion chamber 7 allows the oxidizing air flow to gain a circular motion (further enhanced by the presence of the static mixer 23) so as to optimize the mixing of air and fuel inside the combustion chamber 7.

According to a preferred embodiment, the fuel injector 9 is configured to spray at least 80% (and preferably at least 90-95%) of the fuel against an inner surface 26 of the feeding channel 21; namely, the fuel injector 9 does not directly direct the fuel towards the outside of the feeding channel 21, but, on the contrary, directs the fuel against the inner surface 26 of the feeding channel 21, so that the fuel flowing out of the fuel injector 9 preliminarily hits the inner surface 26 before flowing out of the feeding channel 21 through the nozzle 22. The impact of the fuel against the inner surface 26 allows the fuel droplets emitted by the fuel injector 9 to be atomized in a very effective manner and, by so doing, the mixing of said fuel with the air flowing along the feeding channel 21 is significantly improved; an improvement in the mixing between air and fuel ensures an ideal and, especially, complete combustion of the fuel, thus preventing part of the unburnt fuel from flowing out of the combustion chamber 7.

According to a preferred embodiment, the fuel injector 9 is configured to emit a fuel jet 27 (schematically shown in FIG. 4) having a centrally hollow conical shape, namely having a cross section shaped like an annulus, in which fuel gathers in the periphery. In other words, the fuel injector 9 generates a fuel jet 27 having a conical shape (with the vertex of the cone close to the injection point of the fuel injector 9) and having, at the centre, a hole (namely, an area without fuel) also with a conical shape (with the vertex of the cone close to the injection point of the fuel injector 9); hence, the fuel jet 27 generated by the fuel injector 9 has the shape of a conical shell due to the presence of the central hole, namely it has an internally hollow conical shape.

As mentioned above, the feeding channel 21 is delimited, on the outside, by the outer tubular body 24 (having the inner surface 26 of the feeding channel 21) and is delimited, on the inside, by the inner tubular body 25, which surrounds the fuel injector 9 and contains, on the inside, the fuel injector 9. According to FIGS. 6 and 7, the outer tubular body 24 comprises a conical portion 28, which reduces its size towards the nozzle 22; furthermore, according to a preferred embodiment shown in the accompanying figures, the outer tubular body 24 also comprises a cylindrical portion 29, which is arranged downstream of the conical portion 28 and ends with the nozzle 22. According to a different embodiment which is not shown herein, the outer tubular body 24 has no cylindrical portion 29 and, therefore, comprises the sole conical portion 28. According to a further embodiment which is not shown herein, the cylindrical portion 29 could be replaced by a further conical portion having a smaller taper (convergence) than a taper (convergence) of the conical portion 28.

In the embodiment shown in the accompanying figures, the fuel injector 9 is configured to spray at least part of the fuel against the cylindrical portion 29 (or against the further conical portion) of the outer tubular body 24; in particular, the fuel injector 9 is configured to spray the largest part (almost the entirety) of the fuel against the cylindrical portion 29 (or against the further conical portion) of the outer tubular body 24. According to a different embodiment, the fuel injector 9 is configured to spray at least part of the fuel against the cylindrical portion 29 (or against the further conical portion) of the outer tubular body 24 and at least part of the fuel against the conical portion 28 of the outer tubular body 24; for example, the fuel injector 9 is configured to spray approximately half the fuel against the conical portion 28 of the outer tubular body 24 and approximately half the fuel against the cylindrical portion 29 (or against the further conical portion) of the outer tubular body 24. According to a further embodiment, the fuel injector 9 is configured to spray at least part of the fuel against the conical portion 28 of the outer tubular body 24; in particular, the fuel injector 9 is configured to spray the largest part (almost the entirety) of the fuel against the conical portion 28 of the outer tubular body 24.

Figure 6:
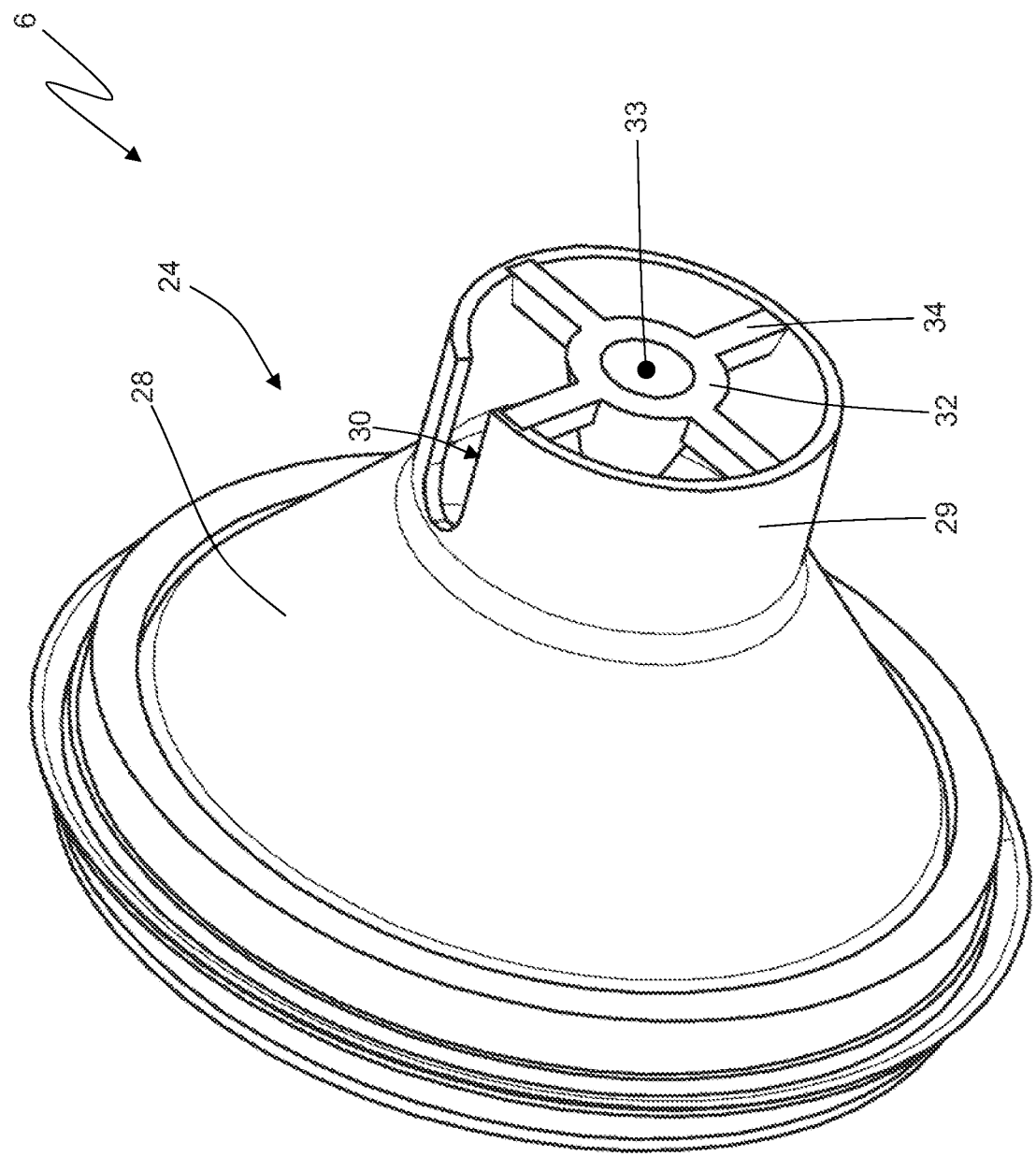
FIG. 6 is a perspective view of an outer tubular body of the heating device of FIG. 1.

According to FIG. 6, the outer tubular body 24 has a through opening 30 (namely, a slit), through which the spray tip of the fuel injector 9 from which fuel flows out (namely, the injection point of the fuel injector 9) aims at the electrodes of the spark plug 10. Thanks to the presence of the through opening 30, a limited part of the fuel jet 27 emitted by the fuel injector 9 does not hit the outer tubular body 24 but goes through the outer tubular body 24 until it directly reaches the electrodes of the spark plug 10. In other words, thanks to the presence of the through opening 30, the limited part of the fuel jet 27 directly "wets" the electrodes of the spark plug 10 so as to create, around the electrodes of the spark plug 10, a local fuel excess (namely, a locally richer mixture), which favours the ignition of the flame and, hence, supports a quicker propagation of the flame to the rest of the mixture. In other words, the fuel injector 9 is configured to spray at least part of the fuel against the outer tubular body 24 and the outer tubular body 24 has the through opening 30, through which a limited part of the fuel jet 27 emitted by the fuel injector 9, instead of hitting the outer tubular body 24, flows through the outer tubular body 24 in order to reach the electrodes of the spark plug 10.

As mentioned above, the static mixer 23 is configured to generate, in the air flowing towards the nozzle 22, a (rotary) swirling motion which has a given direction of rotation around the longitudinal axis 13 of the tubular body 12. According to a preferred embodiment that is better shown in FIG. 6, the through opening 30 is circumferentially shifted, in a direction contrary to the air rotation direction imparted by the static mixer (23), relative to an ideal line connecting an injection point of the injector 9 to the electrodes of the spark plug 10; in other words, the through opening 30 is arranged "in advance" space-wise so as to make up for the rotary motion component imparted by the static mixer 23 (which adds to the action of the "swirl" fuel injector 9) so that the limited part of the fuel jet 27 going through the outer tubular body 24 flowing through the through opening 30 actually reaches (namely, for the most part) the electrodes of the spark plug 10.

According to a preferred embodiment shown in FIGS. 2, 3 and 4, the outlet duct 11 has an initial portion, which is directly connected to the outlet opening 17 of the tubular body 12, has the same shape (namely, the same type of cross section) as the tubular body 12, is coaxial to the tubular body 12 and has an inner diameter D2 that is smaller than the inner diameter D1 of the tubular body 12. In particular, the ratio between the inner diameter D1 of the tubular body 12 and the inner diameter D2 of the initial portion of the outlet duct 11 ranges from 1.2 to 2 and preferably is equal to 1.40.

Figure 5:
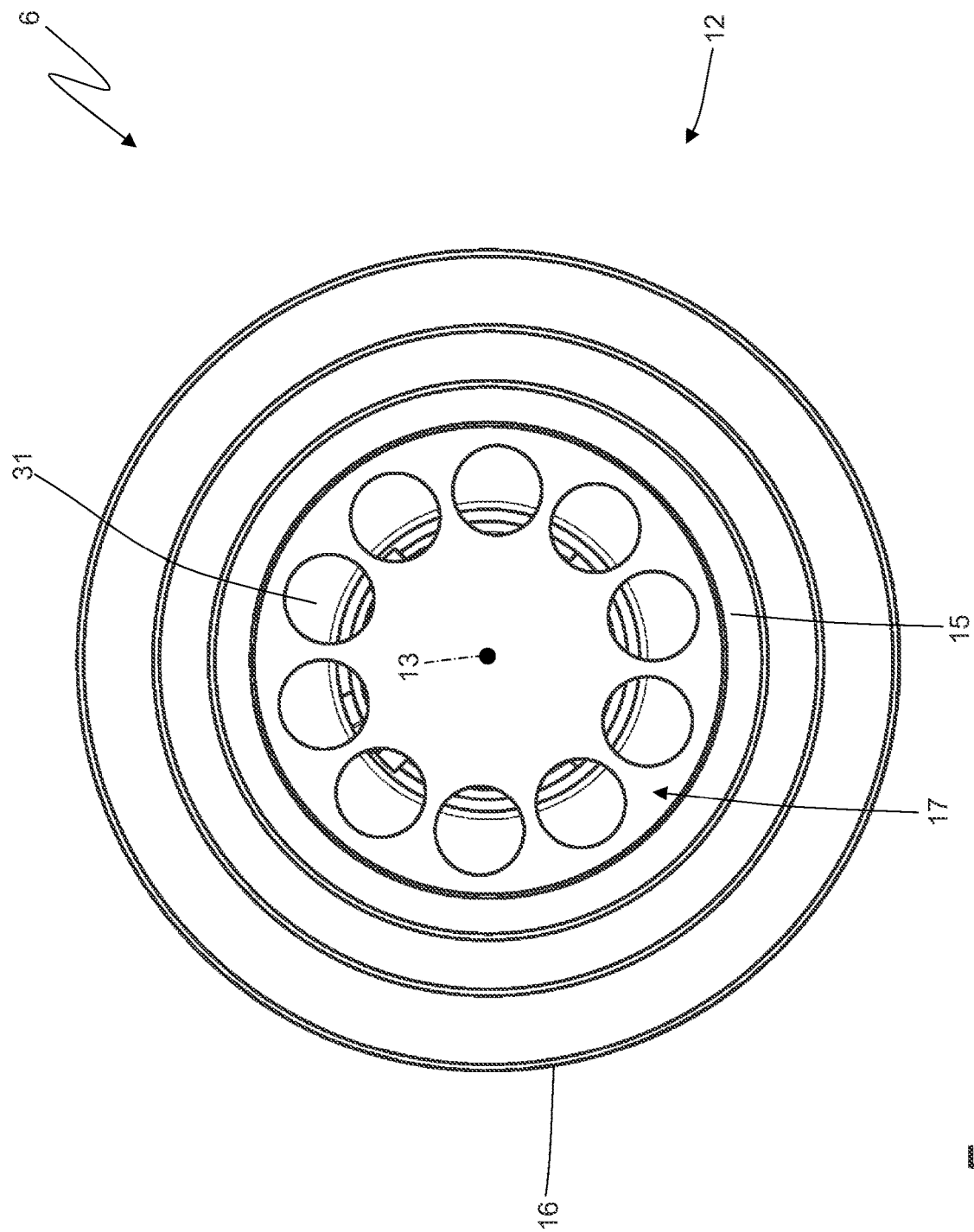
FIG. 5 is a cross section view of the heating device of FIG. 1.

According to FIGS. 3 and 5, the outlet opening 17 constitutes a narrowing of the combustion chamber 7 (namely, a significant reduction in the passage opening) and has, as a whole, a free passage area, which is smaller than 30% of a cross section area of the combustion chamber 7. In other words, the free passage area of the outlet opening 17 (namely, the area through which hot air can flow through the outlet opening 17) is smaller than 30% of the cross section area of the combustion chamber 7; therefore, it is evident that the outlet opening 17 "narrows" the combustion chamber 7 and forces the hot air present in the combustion chamber 7 to gather in order to flow through the outlet opening 17.

According to a preferred embodiment, the free passage area of the outlet opening 17, as a whole, is smaller than 20% of the cross section area of the combustion chamber 7 and, more in particular, the free passage area of the outlet opening 17, as a whole, ranges from 10% to 20% of the cross section area of the combustion chamber 7 and preferably is equal to 15% of the cross section area of the combustion chamber 7.

According to the preferred embodiment shown in the accompanying figures and better visible in FIG. 5, the outlet opening 17 comprises a plurality of through holes 31 (separate from and independent of one another), which go through the second base wall 15 from side to side and are symmetrically arranged around the central longitudinal axis 13 of the tubular body 12 so as to form an annulus. Preferably, the outlet opening (17) comprises at least six, preferably ten (alternatively, eight-twelve) through holes 31, which go through the base wall 15 from side to side and are symmetrically arranged around the central longitudinal axis 13 of the tubular body 12 so as to form an annulus. According to different embodiments which are not shown herein, the outlet opening 17 comprises a smaller number of through holes 31, for example at least two through holes 31 or at least three through holes 31. According to a further embodiment which is not shown herein, the outlet opening 17 comprises one single through hole 31, which goes through the base wall 15 from side to side and is coaxial to the central longitudinal axis 13 of the tubular body 12.

According to the preferred embodiment shown in the accompanying figures, each through hole 31 has a circular shape (in this embodiment, there normally is s larger number of through holes 31, which, as a whole, are smaller); according to a different embodiment which is not shown herein, each through hole 31 has an oblong shape, which develops along an arc of a circle (in this embodiment, there normally is a smaller number of through holes 31, which, as a whole, are larger). Furthermore, both through holes 31 with a circular shape and through holes 31 with an oblong shape can be present.

Figure 8:
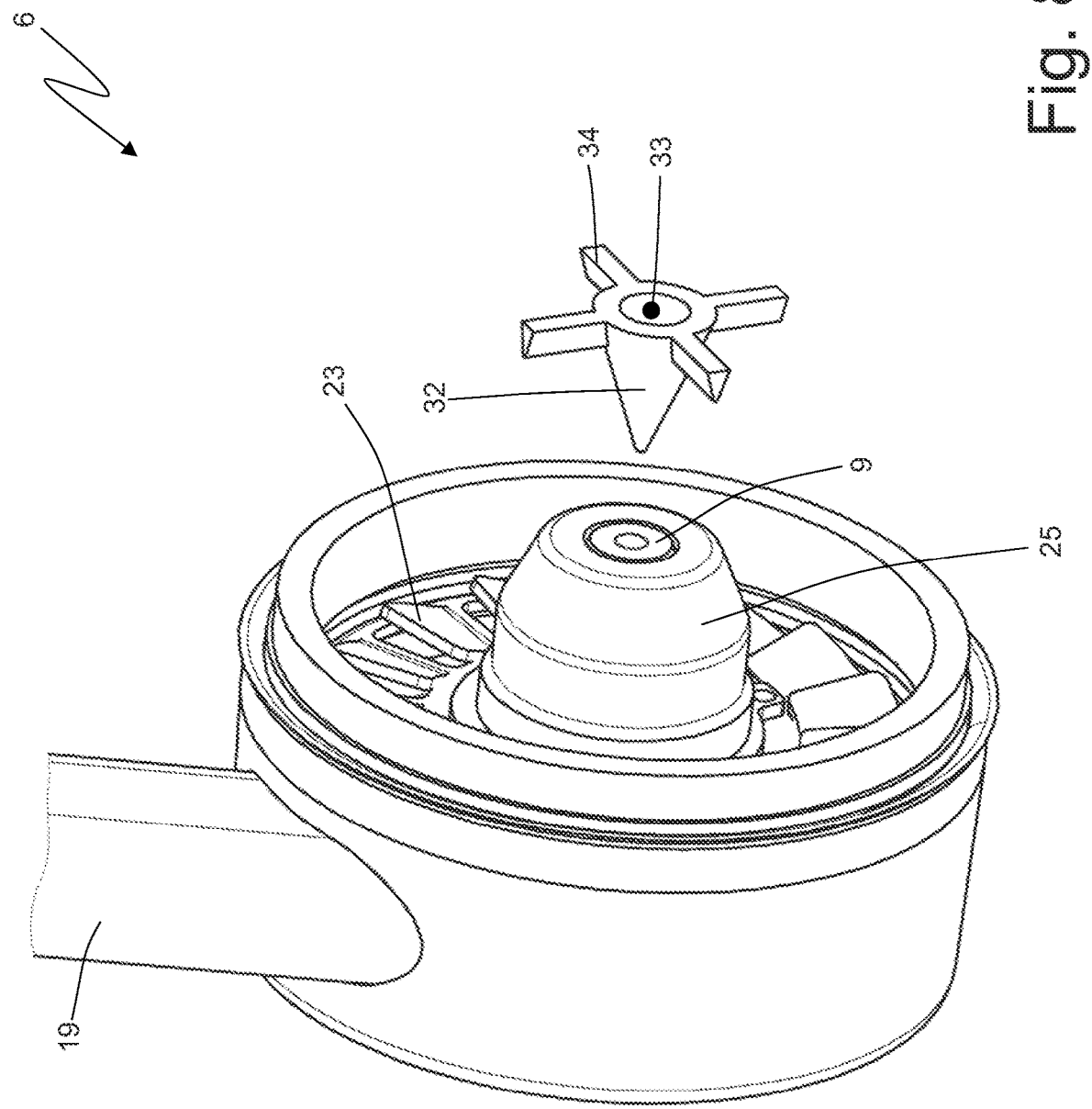
FIG. 8 is a perspective view of an inner tubular body and of a flame holder body of the heating device of FIG. 1.

According to FIGS. 6, 7 and 8, the heating device 6 comprises a flame holder body 32, which is at least partially arranged inside the feeding channel 21 in the area of the nozzle 22, is coaxial to the feeding channel 21 and to the fuel injector 9 (namely, to the longitudinal axis 13) and is in front of the injection point of the fuel injector 9 (namely, in front of the fuel outlet hole, from which fuel flows out of the fuel injector 9). In particular, the flame holder body 32 is arranged at a distance other than zero from the injection point (fuel outlet hole) of the fuel injector 9, so that the flame holder body 32 is spaced apart (far, separate) from the injection point (fuel outlet hole) of the fuel injector (9).

According to the preferred embodiment shown in the accompanying figures, the flame holder body 32 is completely arranged inside the feeding channel 21 and a larger base of the flame holder body 32 ends right in the area of the nozzle 22 (namely, the larger base of the flame holder body 32 is coplanar to a base wall of the feeding channel 21 where the nozzle 22 opens up). According to different embodiments which are not shown herein, the flame holder body 32 is retracted relative to the nozzle 22 (namely, it ends a little before the nozzle 22) or projects past the nozzle 22 (namely, extends out of the feeding channel 21).

According to the preferred embodiment shown in the accompanying figures, the flame holder body 32 has a conical shape having a vertex facing the fuel outlet hole of the fuel injector 9 and a circular base wall, which is opposite the vertex and is axially aligned with the nozzle 22 of the feeding channel 21. Namely, the flame holder body 32 is entirely arranged inside the feeding channel 21 and ends in the area of the nozzle 22 of the feeding channel 21 (since the circular base wall of the flame holder body 32 is axially aligned with the nozzle 22 of the feeding channel 21). Preferably (though not necessarily), the flame holder body 32 is centrally hollow, namely has a central hole 33. According to the preferred embodiment shown in the accompanying figures, the central hole 33 of the flame holder body 32 is a dead hole and originates from a base of the flame holder body 32 opposite a vertex of the flame holder body 32; alternatively, the central hole 33 of the flame holder body 32 is a through hole and, hence, goes through the flame holder body 32 from side to side. According to the preferred embodiment shown in the accompanying figures, the central hole 33 of the flame holder body 32 has a conical shape (basically reproducing the shape of the flame holder body 32); alternatively, the central hole 33 of the flame holder body 32 has a cylindrical shape.

According to the preferred embodiment shown in the accompanying figures, the flame holder body 32 is connected to the outer tubular body 24 by means of four spokes 34 radially arranged in a cross shape (there generally are at least two radially arranged spokes 34). According to the preferred embodiment shown in the accompanying figures, each spoke 34 has a cross section with a triangular shape, which has a vertex oriented towards the fuel injector 9.

Figure 9:
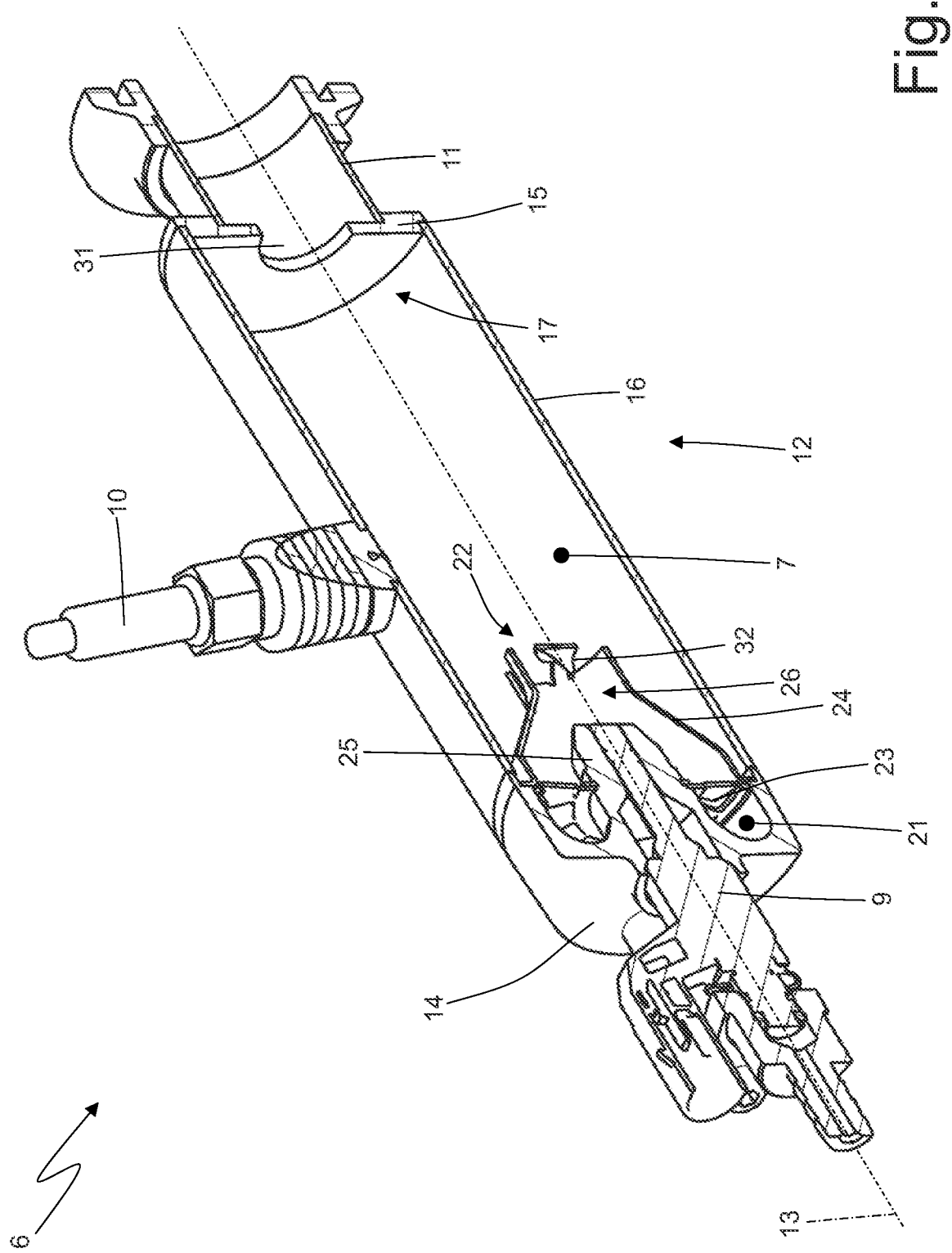
FIG. 9 is a perspective, longitudinal section view of a variant of the heating device of FIG. 1.
Figure 10:
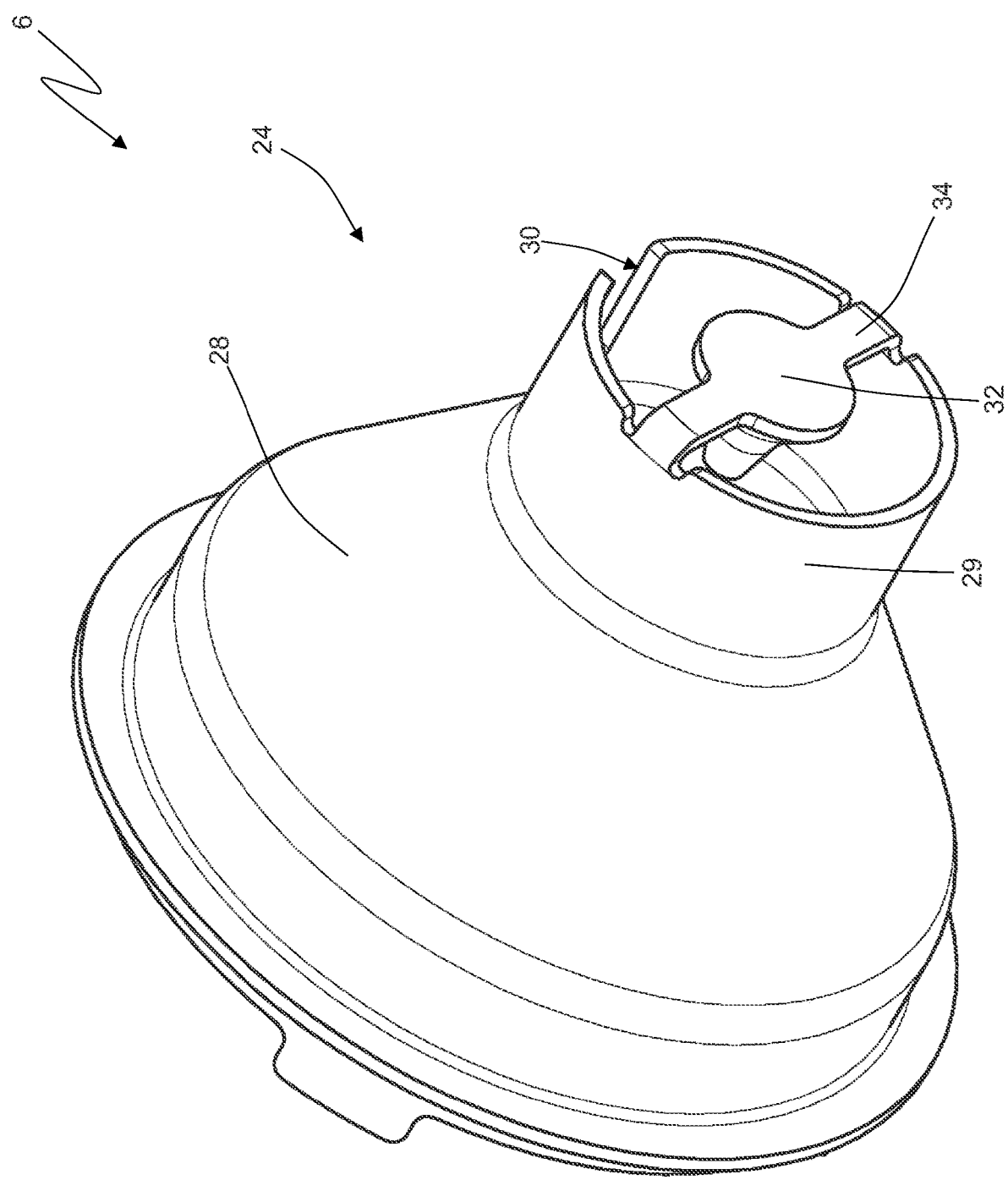
FIG. 10 is a perspective view of an outer tubular body of the heating device of FIG. 9.

FIGS. 9 and 10 show a variant of the heating device 6 shown in FIGS. 2-8.

The heating device 6 shown in FIGS. 9 and 10 is different from the heating device 6 shown in FIGS. 2-8 in that the outlet opening 17 comprises one single through hole 31, which goes through the base wall 15 from side to side and is coaxial to the central longitudinal axis 13 of the tubular body 12.

Furthermore, the heating device 6 shown in FIGS. 9 and 10 is different from the heating device 6 shown in FIGS. 2-8 in that the flame holder body 32 is solid (namely, lacks the central hole 33) and is connected to the outer tubular body 24 by means of only two spokes 34.

The embodiments described herein can be combined with one another, without for this reason going beyond the scope of protection of the invention.

The heating device 6 described above has numerous advantages.

First of all, the heating device 6 described above ensures, in all operating conditions (especially when a large quantity of fuel is injected in order to develop a large quantity of heat), a complete fuel combustion (namely, without introducing unburnt fuel into the exhaust duct 3) thanks to an ideal mixing between the oxidizing air introduced by the nozzle 22 of the feeding channel 21 and the fuel injected by the fuel injector 9.

A complete fuel combustion is also obtained thanks to a high flame stability inside the combustion chamber 7 (especially in case of a "lean" combustion, which takes place with excess oxygen) and, hence, the flame never tends to extinguish or to move back and forth with an oscillatory movement which would cyclically cause the flame to reach out of the combustion chamber 7, thus moving towards the exhaust duct 3. This high flame stability is obtained thanks to a joined action of the outlet opening 17, which "narrows" the combustion chamber 7, and of the flame holder body 32, to which the base of the flame is "anchored". Flame stability can be increased by solely using the outlet opening 17, which "narrows" the combustion chamber 7, (i.e. in the absence of the flame holder body 32) or by solely using the flame holder body 32 (i.e. in the absence of the outlet opening 17, which "narrows" the combustion chamber 7); however maximum flame stability is obtained by combining—together—the outlet opening 17, which "narrows" the combustion chamber 7, and the flame holder body 32, which work together in a joined manner.

In particular, the flame holder body 32 creates, around itself, vortexes of the air-fuel mixture, which tend to push the flame towards the injector 9, namely tend to hold the flame in contact with the flame holder body 32. On the other hand, the outlet opening 17, which "narrows" the combustion chamber 7, constitutes an acoustic impedance, which breaks the resonant motions of the flame and, hence, prevents the flame from oscillating (pulsing) back and forth along the longitudinal axis 13, hence cyclically moving towards the exhaust duct 3.

The heating device 6 described above has a high thermal power in relation to its overall dimensions; namely, even though it is relatively small, the heating device 6 described above generates a high thermal power.

Finally, the heating device 6 described above is simple and economic to be manufactured, since it consists of a few parts with a non-complicated shape and easy to be joined with standard welds and joints.

LIST OF THE REFERENCE NUMBERS OF THE FIGURES 1 exhaust system
2 internal combustion engine
3 exhaust duct
4 silencer
5 treatment device
6 heating device
7 combustion chamber
8 fan
9 fuel injector
10 spark plug
11 outlet duct
12 tubular body
13 longitudinal axis
14 base wall
15 base wall
16 side wall
17 outlet opening
18 inlet opening
19 inlet duct
20 non-return valve
21 feeding channel
22 nozzle
23 static mixer
24 outer tubular body
25 inner tubular body
26 inner surface
27 fuel jet
28 conical portion
29 cylindrical portion
30 through opening
31 through holes
32 flame holder body
33 central hole
34 spokes

The invention claimed is:

1. A heating device (6) for an exhaust system (1) of an internal combustion engine (2); the heating device (6) comprises:
   a tubular body (12), which contains a combustion chamber (7) and is delimited by a first base wall (14) and by a second base wall (15), which are opposite one another;
   a fuel injector (9), which is mounted through the first base wall (14) of the tubular body (12) to inject fuel into the combustion chamber (7) through a fuel outlet hole of the fuel injector (9);
   at least one inlet opening (18), which can be connected to a fan (8) to receive an air flow, which is directed to the combustion chamber (7) and gets mixed with the fuel;
   a feeding channel (21), which receives air from the inlet opening (18), surrounds an end portion of the fuel injector (9), ends with a nozzle (22) arranged around an injection point of the fuel injector (9), is delimited, on the outside, by an outer tubular body (24) having an inner surface (26) of the feeding channel (21) and is delimited, on the inside, by an inner tubular body (25), which surrounds the fuel injector (9) and contains, on the inside, the fuel injector (9);
   a spark plug (10), which is mounted through a side wall (16) of the tubular body (12) to trigger the combustion of a mixture of air and fuel; and
   a flame holder body (32), which is at least partially arranged inside the feeding channel (21) in the area of the nozzle (22), is coaxial to the feeding channel (21) and to the fuel injector (9) and is in front of the fuel outlet hole of the fuel injector (9) at a distance other than zero from the fuel outlet hole of the fuel injector (9), so that the flame holder body (32) is spaced apart from the fuel outlet hole of the fuel injector (9);
   wherein the flame holder body (32) has a conical shape having a vertex facing the fuel outlet hole of the fuel injector (9).

2. The heating device (6) according to claim 1, wherein the flame holder body (32) is centrally hollow.

3. The heating device (6) according to claim 2, wherein the flame holder body (32) has a central dead hole (33) with a conical shape, which originates from a base of the flame holder body (32) opposite a vertex of the flame holder body (32).

4. The heating device (6) according to claim 1, wherein the flame holder body (32) is connected to the outer tubular body (24) by means of at least two radially arranged spokes (34).

5. The heating device (6) according to claim 4, wherein each spoke (34) has a cross section with a triangular shape.

6. The heating device (6) according to claim 1, wherein the flame holder body (32) is entirely arranged inside the feeding channel (21) and ends in the area of the nozzle (22) of the feeding channel (21).

7. The heating device (6) according to claim 1, wherein the flame holder body (32) has a base wall, which is opposite the vertex and is axially aligned with the nozzle (22) of the feeding channel (21).

8. The heating device (6) according to claim 1, wherein the second base wall (15) of the tubular body (12) has at least one outlet opening (17), which is configured to allow a hot air flow to flow out of the tubular body (12), constitutes a narrowing of the combustion chamber (7) and has, as a whole, a free passage area, which ranges from 10% to 20% of the cross section area of the combustion chamber (7) and preferably is equal to 15% of the cross section area of the combustion chamber (7).

9. The heating device (6) according to claim 8, wherein the outlet opening (17) comprises at least three through holes (31), which go through the second base wall (15) from side to side and are symmetrically arranged around a central longitudinal axis (13) of the tubular body (12) so as to form an annulus.

10. The heating device (6) according to claim 1 further comprising a static mixer (23), which is shaped like an annulus, is arranged along the feeding channel (21) and around the fuel injector (9) and is configured to generate, in the air flowing towards the nozzle (22), a swirling motion, which has a given direction of rotation around a longitudinal axis (13) of the tubular body (12).

11. The heating device (6) according to claim 1, wherein the fuel injector (9) is configured to spray at least part of the fuel, preferably at least 80% of the fuel, against the outer tubular body (24).

12. The heating device (6) according to claim 11, wherein the outer tubular body (24) has a through opening (30), through which a limited part of a fuel jet (27) emitted by the fuel injector (9), instead of hitting the outer tubular body (24), flows through the outer tubular body (24) in order to reach electrodes of the spark plug (10).

13. The heating device (6) according to claim 1, wherein the injector (9) is configured to emit a fuel jet (27) having a conical shape hollow at the centre, namely having a cross section shaped like an annulus.

14. An exhaust system (1) of an internal combustion engine (2); the exhaust system (1) comprises:
- an exhaust duct (3), which originates from an exhaust manifold of the internal combustion engine (2) and ends with a silencer (4), from which exhaust gases are released into the atmosphere;
- an exhaust gas treatment device (5), which is arranged along the exhaust duct (3); and
- a heating device (6), which is connected to the exhaust duct (3) upstream of the treatment device (5) by means of an outlet duct (11) coming out of the exhaust duct (3), is designed to generate, by burning fuel, a hot air flow and is manufactured according to claim 1.

\* \* \* \* \*